(12) United States Patent
Ding et al.

(10) Patent No.: US 9,299,508 B2
(45) Date of Patent: Mar. 29, 2016

(54) TOUCH DEVICE AND AN ELECTROSTATIC SHIELDING METHOD THEREOF

(71) Applicant: TPK TOUCH SOLUTIONS (XIAMEN) INC., Xiamen (CN)

(72) Inventors: Hua Ding, Xiamen (CN); Silu Yu, Fuzhou (CN); Fanzhong Zhang, Xiamen (CN)

(73) Assignee: TPK Touch Solutions (Xiamen) Inc., Xiamen (CN)

(*) Notice: Subject to any disclaimer, the term of this patent is extended or adjusted under 35 U.S.C. 154(b) by 160 days.

(21) Appl. No.: 13/917,665

(22) Filed: Jun. 14, 2013

(65) Prior Publication Data
US 2013/0335355 A1    Dec. 19, 2013

(30) Foreign Application Priority Data

Jun. 15, 2012   (CN) .......................... 2012 1 0198144
May 21, 2013   (CN) .......................... 2013 1 0188334

(51) Int. Cl.
| | | |
|---|---|---|
| *G06F 3/0488* | (2013.01) | |
| *H01H 9/12* | (2006.01) | |
| *G06F 3/041* | (2006.01) | |

(52) U.S. Cl.
CPC ............... *H01H 9/12* (2013.01); *G06F 3/0416* (2013.01); *G06F 2203/04107* (2013.01)

(58) Field of Classification Search
CPC ................... G06F 2203/04107; G06F 3/0416; G06F 3/044; G06F 3/0488; G06F 3/04883; H01H 9/12

USPC ............................................ 345/174
See application file for complete search history.

(56) References Cited

U.S. PATENT DOCUMENTS

| | | | |
|---|---|---|---|
| 8,269,743 B2* | 9/2012 | Kuo et al. ..................... 345/174 |
| 2011/0115718 A1* | 5/2011 | Hsieh et al. .................. 345/173 |
| 2011/0291961 A1* | 12/2011 | Hsieh et al. .................. 345/173 |
| 2012/0105337 A1* | 5/2012 | Jun et al. ....................... 345/173 |
| 2012/0127387 A1* | 5/2012 | Yamato et al. ................ 349/42 |
| 2013/0015868 A1* | 1/2013 | Peng ............................ 324/688 |

FOREIGN PATENT DOCUMENTS

| | | |
|---|---|---|
| CN | 101546241 | 9/2010 |
| WO | WO 2011013279 A1 * | 2/2011 |
| WO | WO 2011046391 A2 * | 4/2011 |

\* cited by examiner

*Primary Examiner* — Kumar Patel
*Assistant Examiner* — Mansour M Said
(74) *Attorney, Agent, or Firm* — Gokalp Bayramoglu

(57) ABSTRACT

The present disclosure provides a touch device comprising at least one first conductive axis, a plurality of second conductive units, a plurality of bridging structures and an insulating layer. The first conductive axis has a plurality of openings in which the second conductive units are located respectively. There is a space existed between each of the second conductive units and the corresponding first conductive axis. Each of the majority of the bridging structures are electrically connected to every two adjacent second conductive units in two adjacent first conductive axes. The insulating layer is located between the bridging structure and the first conductive axis. The insulating layer has a plurality of holes exposing the second conductive units respectively, and the bridging structures connect to the second conductive through the holes. In addition, the disclosure also provides an electrostatic shielding method of touch device.

16 Claims, 13 Drawing Sheets

TOUCH DEVICE AND AN ELECTROSTATIC SHIELDING METHOD THEREOF

BACKGROUND OF THE INVENTION

This Application claims the benefit of the People's Republic of China Application No. 201210198144.3, filed on Jun. 15, 2012 and No. 201310188334.1, filed on May 21, 2013.

FIELD OF THE INVENTION

The present disclosure relates to touch technology, more particularly to a touch device and an electrostatic shielding method thereof.

DESCRIPTION OF THE RELATED ART

Presently, due to personal digital assistants (PDA), mobile phones, notebook computers, tablet personal computers, and other portable electronic products need to be thin in thickness and also, light in weight, the traditional input devices, such as keyboards or mouse, have to be replaced with other input devices. Especially, when the need for tablet personal computers has greatly increased, a touch panel has become one of the key components used in electronic products as an interface for data communication.

When a conventional touch device sends or receives signals, an extra shielding layer is added into the structure of the touch device for preventing touch signals from signal interference caused by other external electronic devices, based on the electrostatic shielding theory, the extra shielding layer can increase the anti-interference ability of the touch device. However, the addition of such a shielding layer tends to increase the integral thickness of the touch device, accompanying with a relatively higher manufacturing cost and more complicated manufacturing process.

SUMMARY OF THE DISCLOSURE

The present disclosure provides a touch device and an electrostatic shielding method thereof.

The disclosure provides a touch device comprising at least one first conductive axis, a plurality of second conductive units, a plurality of bridging structures and an insulating layer. The first conductive axis has a plurality of openings in which the second conductive units are located respectively. There is a space existed between each of the second conductive units and the corresponding first conductive axis. Each of the majority of the bridging structures are electrically connected to every two adjacent second conductive units in two adjacent first conductive axes. The insulating layer is located on the positions between the budging structure and the first conductive axis. The insulating layer has a plurality of holes exposing the second conductive units respectively, and the bridging structures connect to the second conductive through the holes. Upon a driving signal received by the second conductive units, the first conductive axis is connected to a grounding potential or a fixed potential, so as to conduct electrostatic shielding for the second conductive units.

The disclosure also provides an electrostatic shielding method of touch device. The method comprises steps of: driving a first conductive axis to detect the output signals of the first axis and acquire first information concerning touch position in the first direction; second, connecting the first conductive axis to it grounding potential or a fixed potential so as to conduct electrostatic shielding for second conductive axes; third, driving the second conductive axes to detect the output signals of the second axes and acquire second information concerning touch position in the second direction; finally, combining the first information and the second information concerning touch position in the first direction and the information concerning touch position in the second direction to calculate coordinates of touch positions.

The first conductive axes used for sensing touch positions can also be used as a shielding layer without the manufacture of an extra shielding layer, thus reduce the integral thickness and the manufacturing cost of the touch device, and further, simplify the manufacturing process, and, meanwhile, enable the touch device to have anti-interference function.

BRIEF DESCRIPTION OF THE DRAWINGS

For those skilled in the art, numerous embodiments and drawings described below are for illustration purpose only, and not to limit the scope of the present disclosure in any manner.

DETAILED DESCRIPTION OF THE EMBODIMENTS

Figure 1:
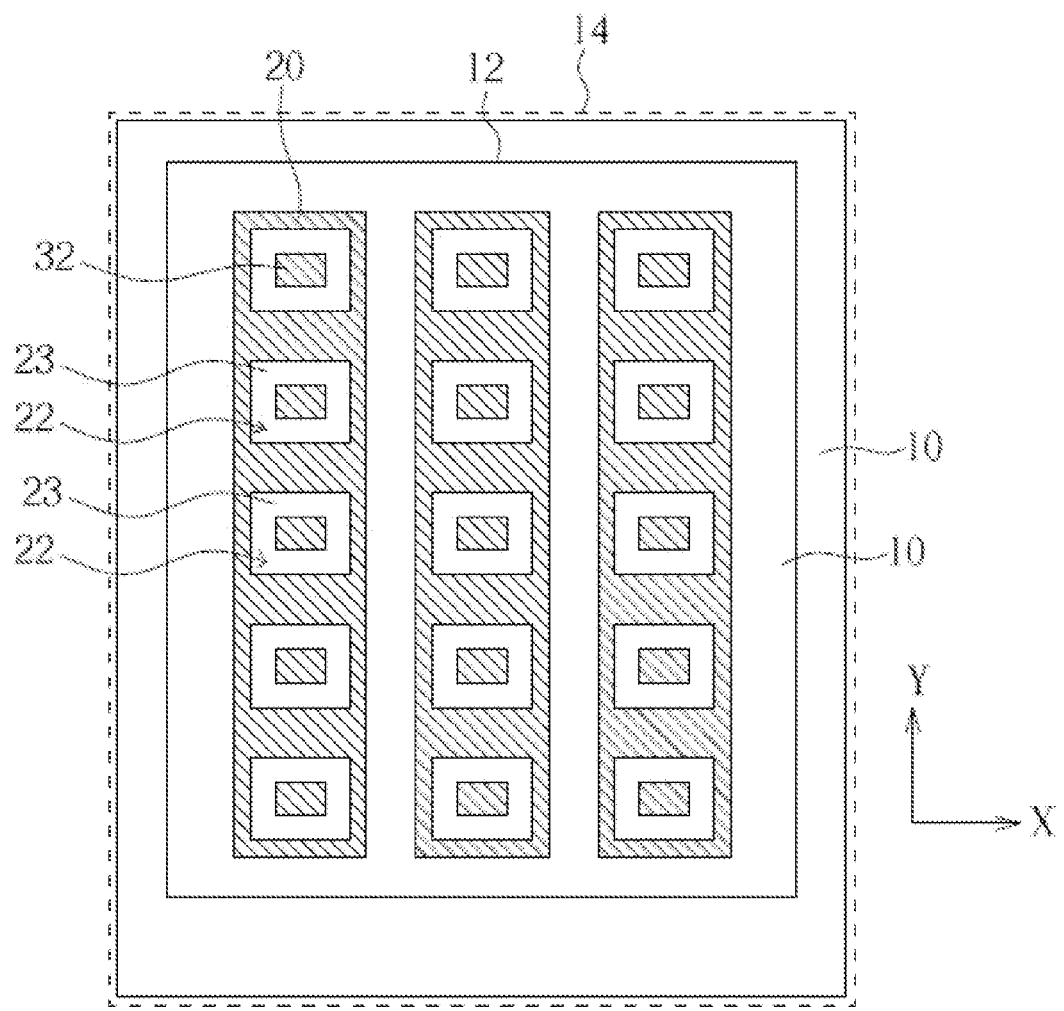
FIG. 1 is a top-view schematic diagram of the structure in accordance with a first embodiment of the disclosure.

To provide a better understanding of the present disclosure to a person skilled in the art, preferred embodiments are detailed as follows. The preferred embodiments of the present disclosure are illustrated in the accompanying drawings with numbered elements to clarify the contents and effects to be achieved.

Those of ordinary skill in the art will recognize that the figures are only for illustration and the figures may not be to scale. The scale may be further modified according to different design considerations. On referring to the words "up" or "down" that describe the relationship between components in the text, it is well known to a person skilled in the art that these words refer to relative positions that can be inverted to obtain a similar structure, and these structures should therefore not be precluded from the scope of the claims in the present disclosure.

FIGS. 1~6 are schematic diagrams of the structures of a touch device in accordance with the first embodiment of the disclosure. With reference to FIGS. 1~6, the touch device 1 comprises at least one first conductive axis 20, a plurality of second conductive units 32, a plurality of bridging structures 62 and an insulating layer 50. The first conductive axis 20 has a plurality of openings 22 in which the second conductive units 32 are located respectively, wherein there is a space 23 existed between each of the second conductive units 32 and the corresponding first conductive axis 20 to make the second conductive units 32 insulated to the corresponding first conductive axis 20. Each of the majority of the bridging structures 62 (bridging structures 62 such as located between the first conductive axes 20) is electrically connected to every two adjacent second conductive units 32 in two adjacent first conductive axes 20. The insulating layer 50 is located between the bridging structures 62 and the first conductive axes 20, and in other embodiments, part of the insulating layer 50 may be also located between the bridging structures 62 and the second conductive units 32, to make the bridging structures 62 electrically insulated to the first conductive axes 20. The insulating layer 50 has a plurality of holes 52 exposing the second conductive units 32 respectively, and the bridging structures 62 electrically connect to the second conductive units 32 through the holes 52. Upon a driving signal (not shown in Figs.) received by the second conductive units 32, the first conductive axis 20 is connected to a grounding potential or a fixed potential, so as to conduct electrostatic shielding for the second conductive units 32.

According to the touch device provided in the embodiment of the disclosure, the following content describes the components of the touch device respectively according to their formation steps, but the structure of the touch device is not limited to such formation steps.

With further reference to FIG. 1, the touch device provided in the preferred embodiment of the disclosure also comprises a substrate 10 on which the first conductive axes 20 and the second conductive units 32 are disposed. Furthermore, the substrate 10 is delimited as a touch area 12 and a peripheral area 14. The plurality of first conductive axes 20 and the plurality of second conductive units 32 are disposed in the touch area 12. The first conductive axes 20 with the plurality of openings 22 are arranged in parallel along a first direction (for example, along Y axis). The second conductive units 32 are located in the openings 22, without intersecting or contacting with the first conductive axes 20. In this embodiment, the material of the substrate 10 can be selected from transparent materials such as glass, polymethylmethacrylate (PMMA), polyvinylchloride (PVC), polypropylene (PP), polyethylene terephthalate (PET), polyethylene naphthalate (PEN), polycarbonate (PC), and poly-styrene (PS) etc. The materials of the first conductive axes 20 and the second conductive units 32 can include various transparent conductive materials, for instance, indium tin oxide (ITO), aluminum zinc oxide (AZO), indium tin zinc oxide (ITZO), zinc oxide, cadmium oxide, hafnium oxide (HfO), indium gallium zinc oxide (InGaZnO), indium gallium zinc magnesium oxide (InGaZnMgO), indium gallium magnesium oxide (InGaMgO) or indium gallium aluminum oxide (InGaAlO) and so on. The first conductive axes 20, the second conductive units 32 and the openings 22 are roughly in rectangular shape, but their shapes can be designed according to the specific requirements, for example, the shapes of the second conductive units 32 and the openings 22 can also be round, rhombic and orthohexagonal etc. The periphery of the second conductive units 32 are surrounded by the corresponding first conductive axes 20. Moreover, the sequential order of manufacturing the first conductive axes 20 and the second conductive units 32 is not limited in this embodiment, and can also be firmed in a same step simultaneously or in two steps respectively.

Figure 2:
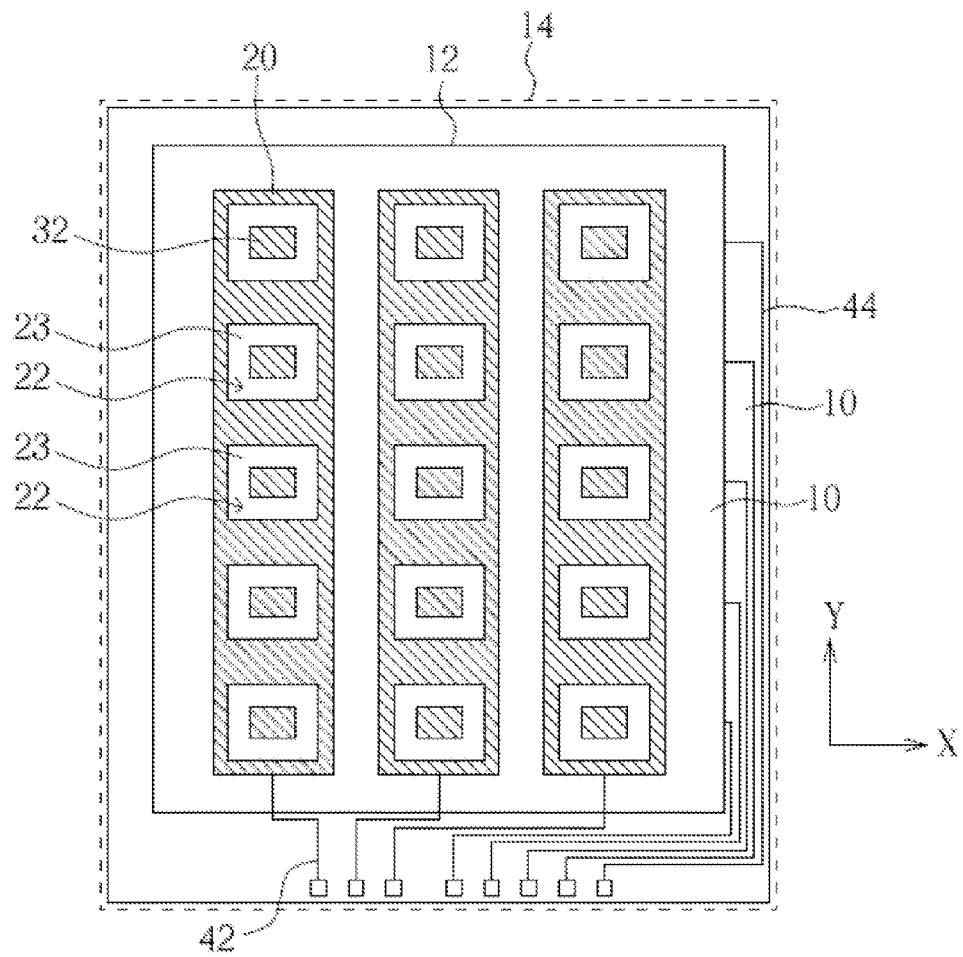
FIG. 2 is a top-view schematic diagram of the structure in accordance with the first embodiment of the disclosure.

As shown in FIG. 2, a plurality of first conductive wires 42 are formed within the touch area 12 and the peripheral area 14 to electrically connect with the first conductive axes 20. A plurality of second conductive wires 44 are formed only within the peripheral area 14 and will electrically connect to the second conductive axes that will be formed in the subsequent process. The first conductive wires 42 and the second conductive wires 44 are also connected to an external microprocessor (not shown) for transmitting the touch signals to the microprocessor or for receiving driving signals, a grounding potential and/or a fixed potential from the microprocessor. The materials of the first conductive wires 42 and the second conductive wires 44 can be selected from metals such as aluminium, copper, silver or the above-mentioned transparent conductive materials. When the first conductive wires 42 and the second conductive wires 44 are of the same material as of the first conductive axes 20 and the second conductive units 32, they can be formed simultaneously with the manufacture of the first conductive axes 20 and the second conductive units 32. It should be noted that at this moment the second conductive wires 44 are not electrically connected to the second conductive units 32 yet.

Figure 3A:
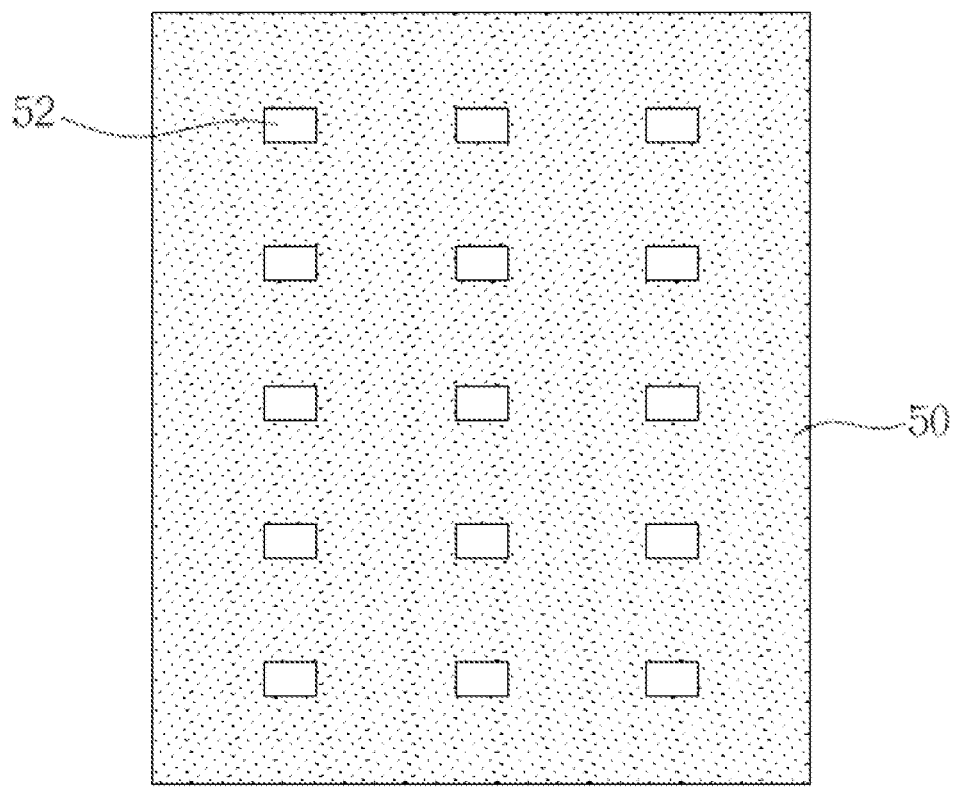
FIG. 3A is a top-view schematic diagram of the insulating layer in the first embodiment of the disclosure.
Figure 3B:
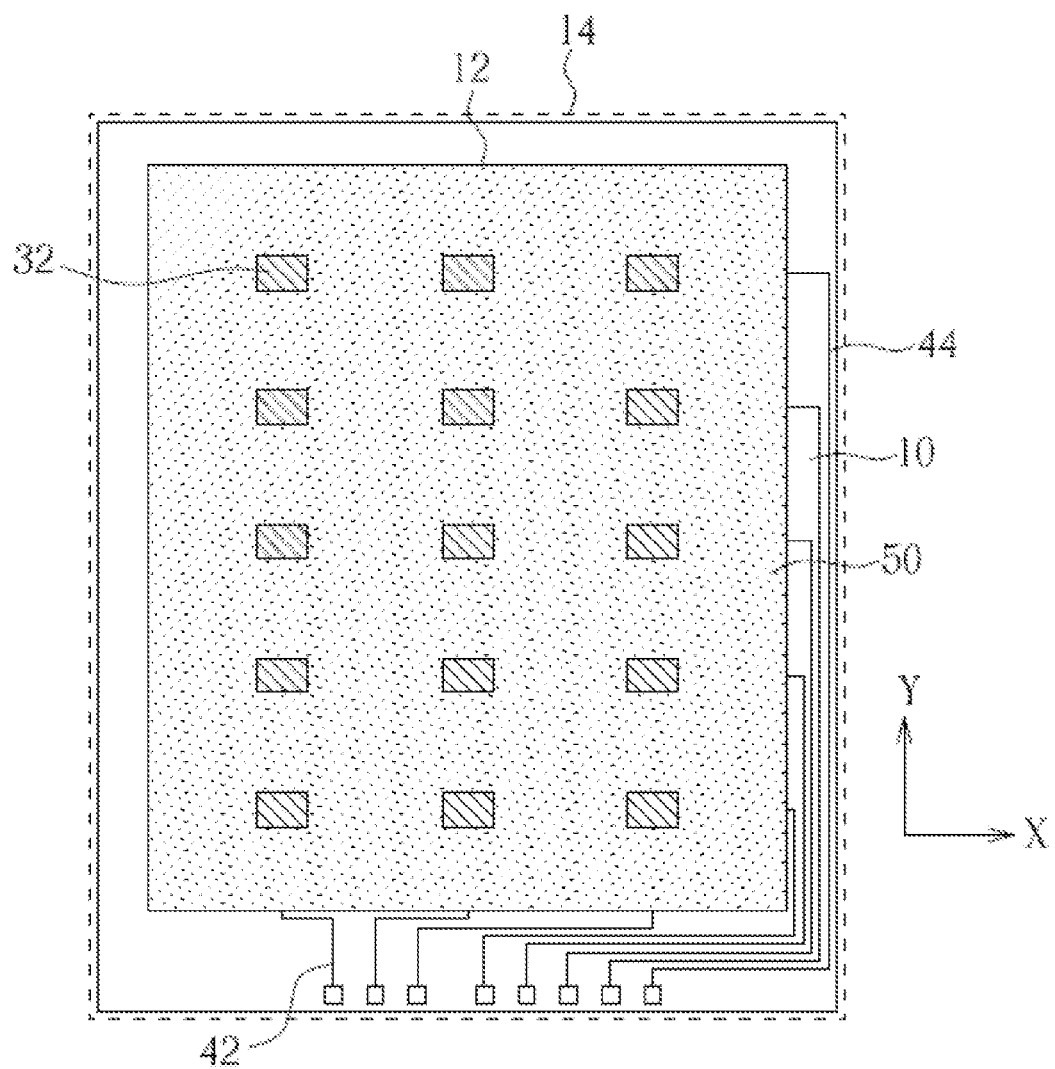
FIG. 3B is a top-view schematic diagram of the structure in accordance with the first embodiment of the disclosure.

Next, an insulating layer is formed within the touch area 12 and covers the first conductive axes 20 and may be partial of the second conductive units 32. From the top view of patterns on the insulating layer alone, a plurality of holes 52 are existed in the middle area of the insulating layer 50, as shown in FIG. 3A. After the insulating layer 50 covers the touch area 12, as shown in FIG. 3B, the holes 52 will expose the second conductive units 32 respectively for being contact holes to let the bridging structures 62 electrically connect with the second conductive units 32 later. In this embodiment, the insulating layer 50 adopts a variety of non-conductive materials such as Polyimide (PI), SiO2, SiN. SiON and SiC and so on. After the insulating layer 50 is formed, the second conductive units 32 will be exposed and the first conductive axis 20 will be covered by the insulating layer 50, in other embodiment, the partial first conductive wires 42 and second conductive wires 44 will be exposed.

Figure 4:
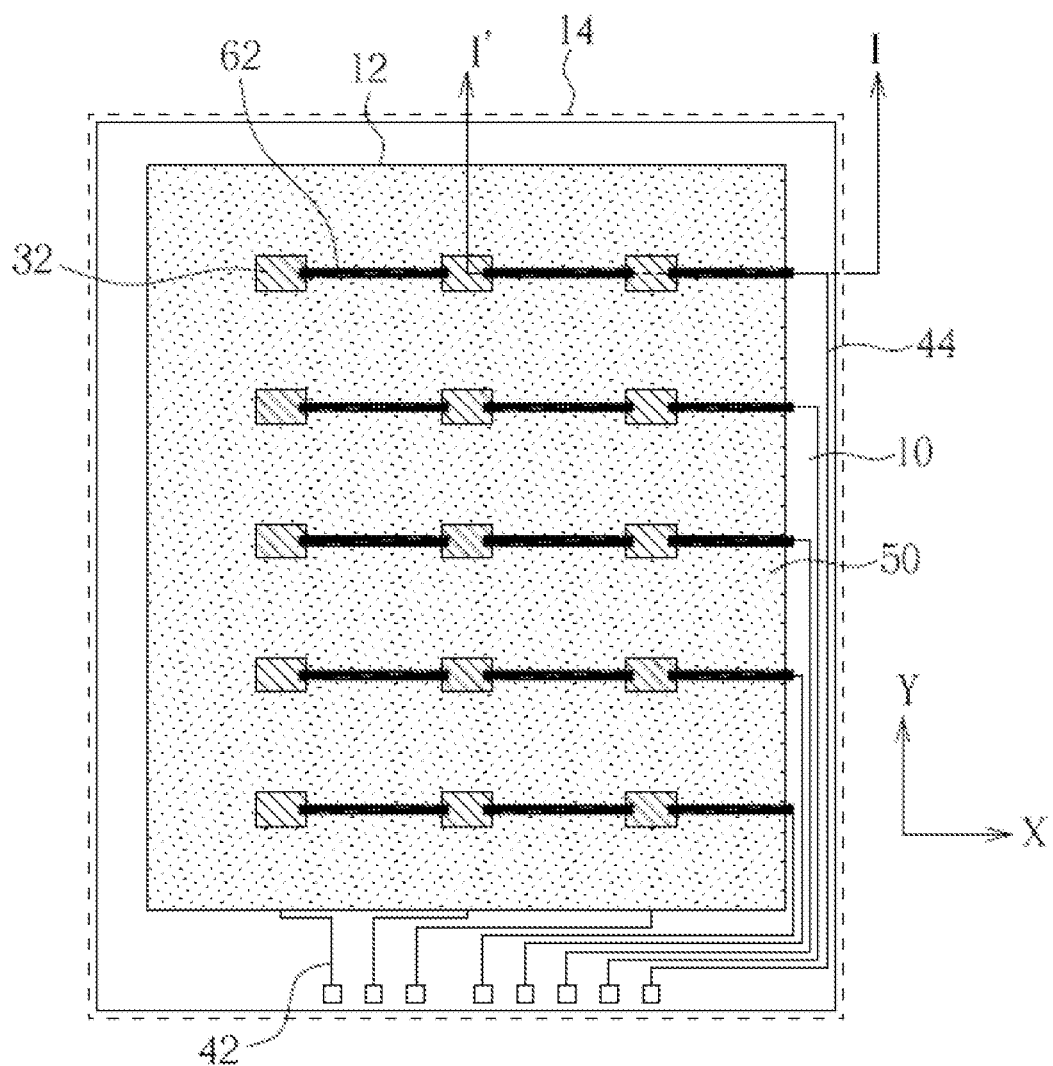
FIG. 4 is a top-view schematic diagram of the structure in accordance with the first embodiment of the disclosure.
Figure 5:
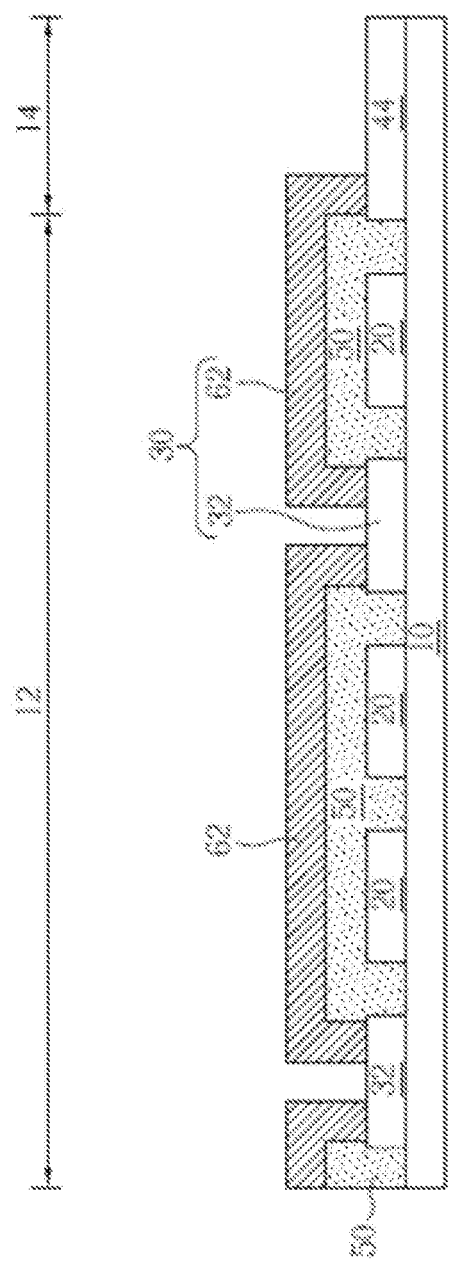
FIG. 5 is a cross-sectional schematic diagram of the structure along a cross-hatching IT in FIG. 4.

Next, bridging structures are formed on the insulating layer 50, at this moment the top view of the touch device of this disclosure is as shown in FIG. 4, whereas FIG. 5 is a cross-sectional schematic diagram of the structure along the cross-hatching II' in FIG. 4. With reference to FIGS. 4 and 5, each of the majority of the bridging structures 62, showing arch shape from a lateral side, crosses over the insulating layer 50 and electrically connects every two adjacent second conductive units 32 in two adjacent first conductive axes 20 to make the second conductive units 32 connect serially to form a plurality of second conductive axes 30. And each of the minority of the bridging structures 62 also extend towards the peripheral area 14 and are electrically connected to the second conductive wires 44, via this connection the touch signals of the second conductive axes 30 are transmitted to the external microprocessor. Since the first conductive axes 20 surround the second conductive units 32, the first conductive axes 20 can function as a shielding layer of the second conductive units 32, that is, when the second conductive units 32 are driven by receiving the driving signals from the external microprocessor, the first conductive axes 20 may be controlled by the external microprocessor to connect to the grounding potential or the fixed potential for effectively shielding the interference of the outside signals to the second conductive axes 30, thus reducing the extent of signal interference of the integral touch device. Moreover, since the first conductive axes 20 of this disclosure is not only used to sense touch positions but also function as a shielding layer, there is no necessity of manufacturing an extra shielding layer and thus, the integral thickness of touch device can be reduced, thereby simplifying manufacture process and saving costs and enabling the touch device to have anti-interference function.

Figure 6:
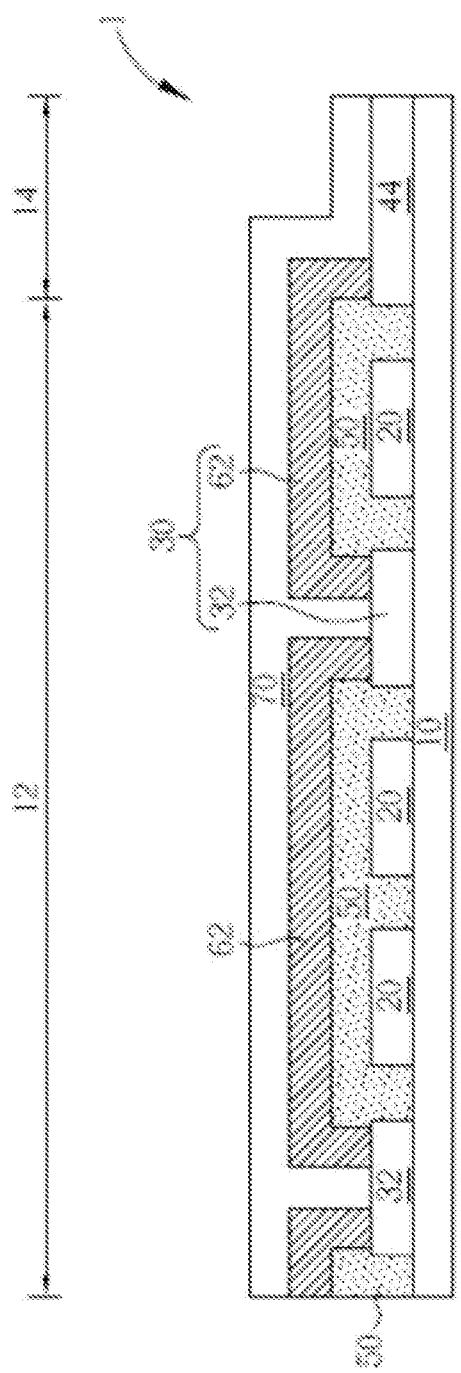
FIG. 6 is a cross-sectional schematic diagram of the structure in accordance with the first embodiment of the disclosure.

Finally, as shown in FIG. 6, a protective layer 70 can be overlaid and disposed on the first conductive wires 42, the second conductive wires 44 and the bridging structures 62 to protect the components stacked-up on the substrate 10 from vapour and oxygen in the air. The material of the protective layer 70 comprises inorganic materials such as silicon nitride, silicon oxide and silicon oxynitride, and organic materials, for example, acrylic resin or other suitable materials.

Further, the touch device provided in the embodiment of this disclosure can also comprise at least a display unit (not shown) located underneath the substrate. The display unit can be liquid crystal display (LCD) or other optical assemblies. There is no shielding layer that exists between the substrate and the display unit, while the first conductive axes, used for sensing touch positions, function simultaneously as a shielding layer for shielding the signal interference of the display unit or other optical assemblies to the touch device. In view thereof, the integral thickness of touch device can be reduced, with lower costs and simplified manufacturing process.

This disclosure can be applied to manufacture various touch devices such as mobile phone, personal digital assistant or satellite navigation system etc., as for other applications, printed circuit board or flexible printed circuit can be used to manufacture the touch device of the disclosure.

In this embodiment the first conductive axes 20 are arranged in parallel along a first direction (for example, along Y axis), and the second conductive axes 30, formed by connecting the second conductive units 32 serially with the bridging structures 62, are arranged in parallel along a second direction (for example, along X axis). The first direction may be perpendicular to the second direction, but is not limited herein, and the arrangement can be accorded with the actual requirements.

Compared with the conventional touch devices, the touch device provided in this disclosure does not require an extra shielding layer to be manufactured, as the conductive axis can be used for sensing, touch positions and also, function as a shielding layer, thereby reducing the integral thickness of the touch device and the manufacturing costs and simplifying the manufacturing process. The interference of outside electronic signals can thus be decreased and the stability of the touch device can be improved.

The following text will make illustration for different embodiments about the touch device of this disclosure, and for simplifying the description, the following text is primarily aimed at the specification of different points concerning various embodiments, the same points will be referred to the embodiments and not be repeated again. In addition, the same components of various embodiments of this disclosure are marked with the identical labels to facilitate mutual contrast among different embodiments.

Figure 7:
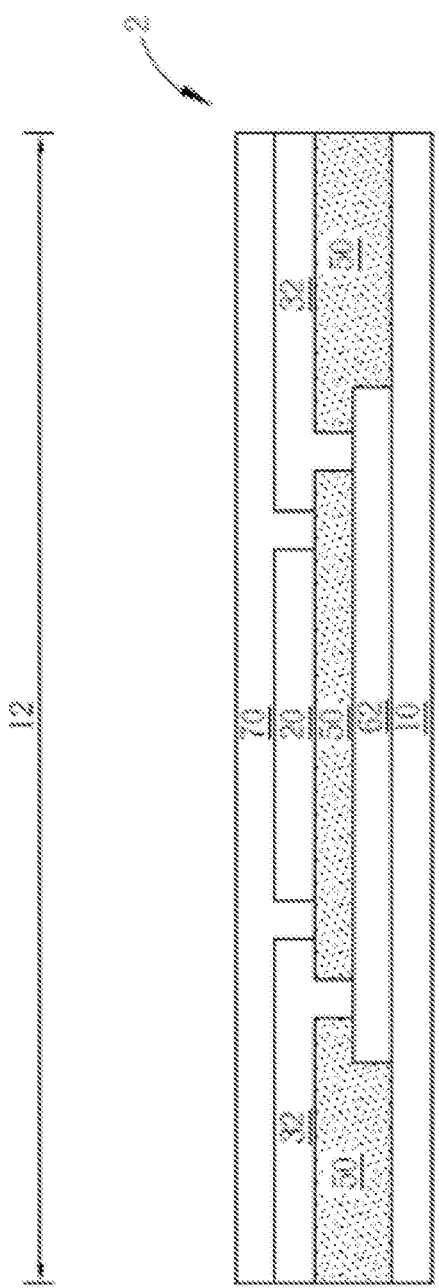
FIG. 7 is a cross-sectional schematic diagram of a partial structure in accordance with the second embodiment of the disclosure.

FIG. 7 is a cross-sectional diagram of the partial structure in accordance with the second preferable embodiment of the disclosure. With reference to FIG. 7, the points of difference from the first embodiment are that the bridging structures 62 are disposed on the substrate 10, that is, the touch device 2 has a substrate 10 on which the bridging structures 62 are formed first and then covered with an insulating layer 50 to expose at least a part of bridging structures 62. Subsequently, a plurality of first conductive axes 20 and a plurality of second conductive units 32 surrounded by the first conductive axes 20 are formed. When the second conductive units 32 are formed, they contact with the bridging structures 62 underneath via the holes of the insulating layer 50, that is, every two adjacent second conductive units 32 in two adjacent first conductive axes 20 are electrically connected via a bridging structure 62. The second conductive units 32 are conducted mutually to be further connected in series for forming a second conductive axis. Finally, a protective layer 70 is overlaid and disposed on the first conductive axes 20 and the second conductive units 32, in this process the touch device 2 of the second preferable embodiment of this disclosure is completed. Since most of the bridging structures 62 are covered with the insulating layer 50, the bridging structures 62 can be concealed underneath the insulating layer 50 to increase the aesthetic extent of the touch device from the top angle of the touch device. Similarly this embodiment can also be applied to manufacture various different products, and the materials of the components used in the embodiment are the same as the first preferable embodiment, but the same is not repeated again.

Figure 8:
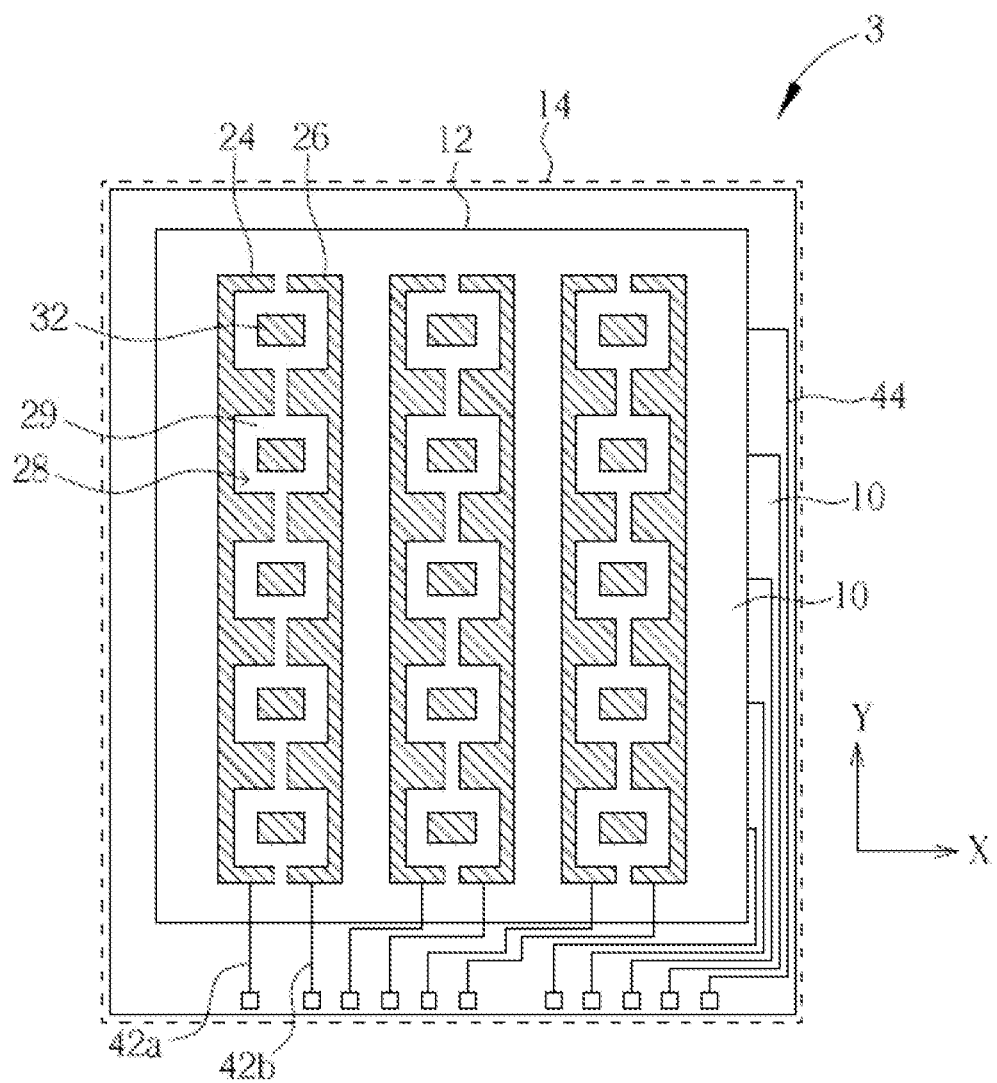
FIG. 8 is a top-view schematic diagram of the structure in accordance with the third embodiment of the disclosure.

FIG. 8 is a top-view schematic diagram of the structure in accordance with the third embodiment of the disclosure. The point of difference from the first preferred embodiment are that the first conductive axis of the touch device 3 is divided into two axes respectively as the first left-side conductive axis 24 and the first right-side conductive axis 26 separated from each other, and the intermediate region between the first left-side conductive axis 24 and the first right-side conductive axis 26 is defined as an opening-hole area 28 in which the second conductive units 32 are located respectively, wherein there is a space 29 existed between each of the second conductive units 32 and the corresponding first left-side conductive axis 24 and between the second conductive units 32 and the corresponding first right-side conductive axis 26 to make the second conductive units 32 insulated to the corresponding the first left-side conductive axis 24 and the first right-side conductive axis 26. In this embodiment, since a previous first conductive axis is divided into two axes respectively connected with the conductive wire 42*a* and the conductive wire 42*b*, the measurement accuracy for the first direction direction in this embodiment) can be further increased. The first left-side conductive axis 24 and the first right-side conductive axis 26 surround the second conductive units 32 to realize the shielding function, which has the same advantages as the first embodiment of this disclosure.

Figure 9:
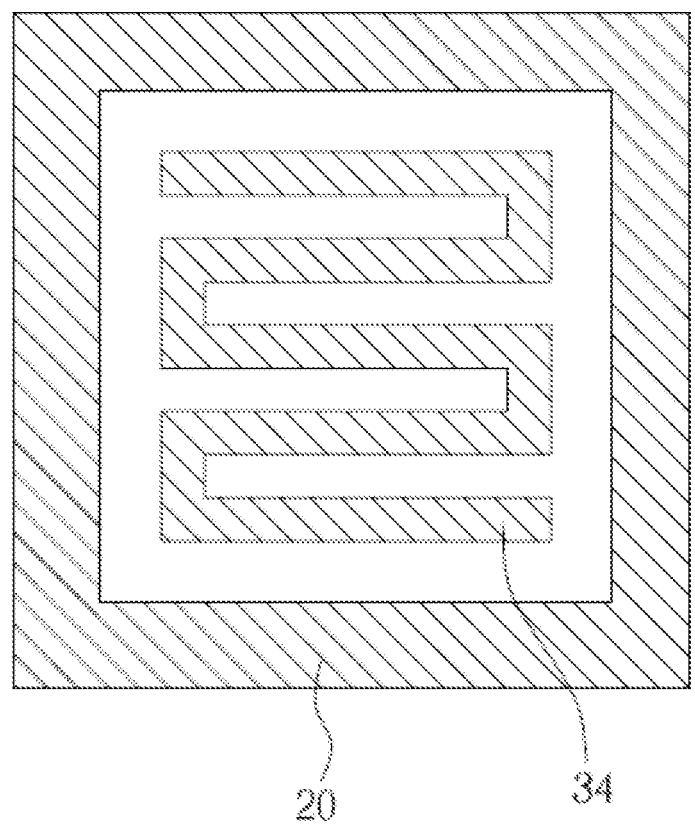
FIGS. 9~11 are respectively the top-view schematic diagrams of partial structures in another three embodiment models in accordance with the first embodiment of the disclosure.
Figure 10:
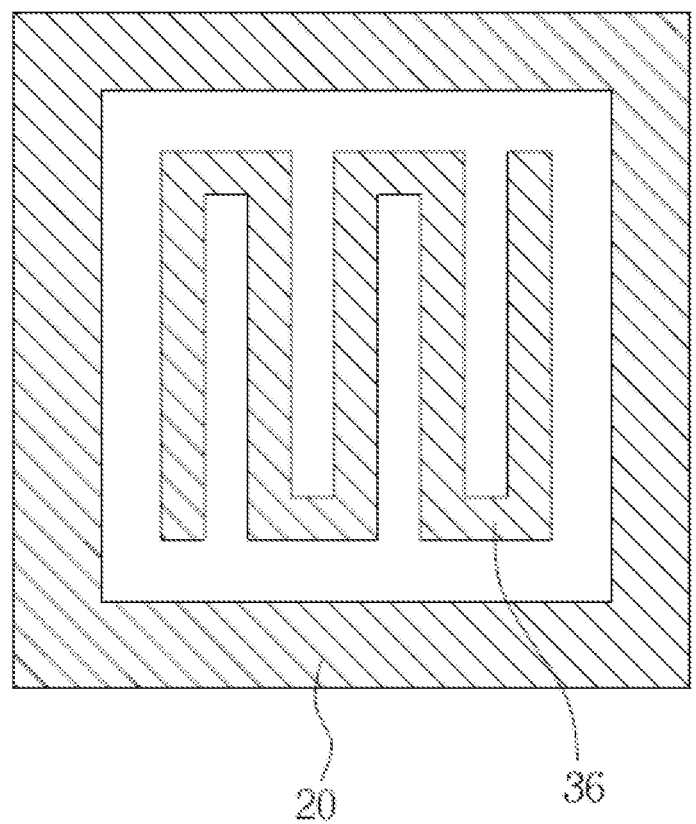
Figure 11:
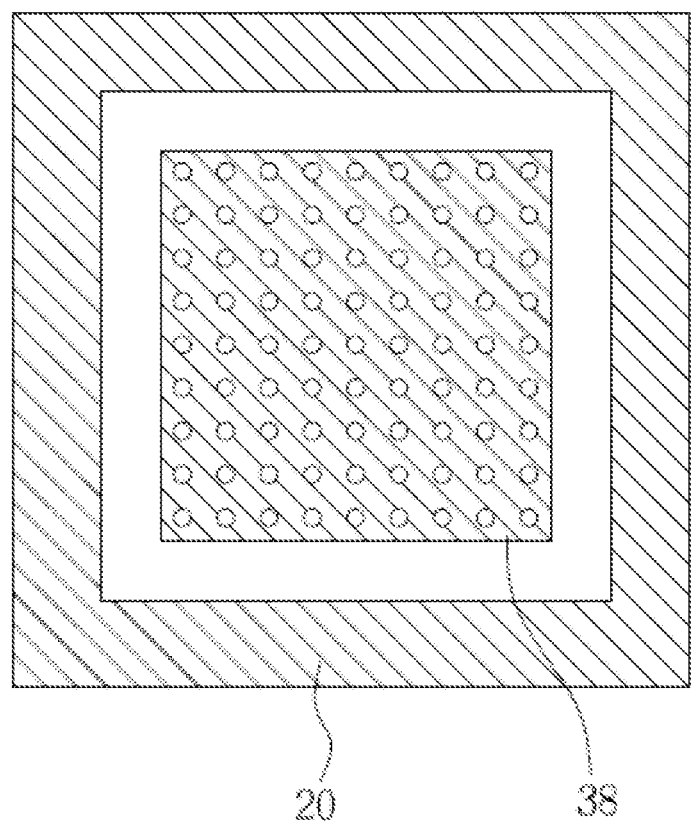

FIGS. 9~11 are respectively top-view schematic diagrams of the partial structures of other three embodiments in accordance with the first embodiment of this disclosure. FIGS. 9~11 only show a part of first conductive axes and a second conductive unit. The points of difference from the first embodiment of this disclosure are that the second conductive units of various embodiments are patterned conductive units to promote the transmittance of the integral touch device. With reference to FIG. 9, the second conductive units previously in rectangular shape are replaced by the second conductive units 34 of this embodiment pattern presenting in S shape along a horizontal direction. With reference to FIG. 10, the second conductive units previously in rectangular shape are replaced by the second conductive units 36 of this embodiment pattern presenting in S shape along a vertical direction. As for the way of formation of the second conductive units of S shape in the embodiment patterns of FIGS. 9~10, the second conductive units of rectangular shape are formed firstly via lithography and etching process and a plurality of strip openings are etched on these conductive units, or the second conductive units arranged in S shape are formed by direct printing process. With reference to FIG. 11, the central part of the second conductive units 38 of this embodiment has a plurality of small holes. The materials of the components used in the foregoing embodiment patterns are the same as the first embodiment, but is not limited herein. The foregoing embodiments changing variably can improve the transmittance of the integral touch device. Of course, the foregoing different patterning embodiments can also be integrated with the second or third embodiments, which are not limited to the variation of the first embodiment.

The touch device of this disclosure is not limited to the structure or the method described in the foregoing embodiments. Provided that the first conductive axis and the second conductive axis are located on a same layer, and that the bridging structures are located on another layer, and that the first conductive axis can function as a shielding layer simultaneously, all these belong to the scope covered by this disclosure.

Figure 12:
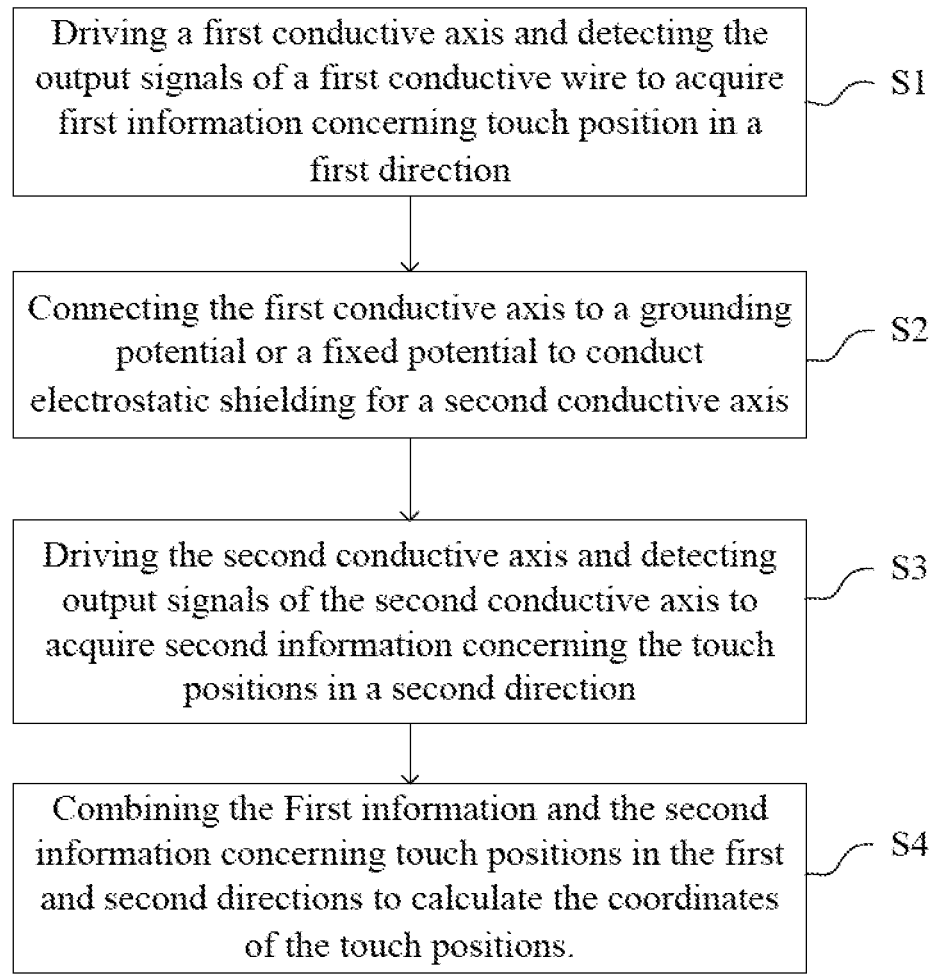
FIG. 12 is a flow chart of the electrostatic shielding method for touch device in the disclosure.

According to the touch devices provided by the foregoing embodiments, the embodiment of this disclosure also provides an electrostatic shielding method of the said touch devices. FIG. 12 is a flow chart of the electrostatic shielding method for the touch device of this disclosure. With reference to FIG. 12, the electrostatic shielding method for the touch device provided by the embodiment of this disclosure specifically includes the following steps:

S1: Driving a first conductive axis and detecting the output signals of the first conductive axis, especially via a first conductive wire corresponding to the first conductive axis, to acquire first information concerning touch position in a first direction.

S2: Connecting the first conductive axis to a grounding potential or a fixed potential (such as a 5V voltage). In this step, the first conductive axis, being connected to the grounding potential or the fixed potential, also performs electrostatic shielding function for the second conductive axis so as to reduce the interference of outside noise signals to subsequent detection of the output signals from a second conductive wire.

S3: Driving a second conductive axis and detecting the output signals from the second conductive axis, especially via a second conductive wire corresponding to the second conductive axis, to acquire second information concerning touch position in a second direction.

S4: Combining the first and the second information concerning touch positions in the first and second directions to calculate the coordinate of the touch position.

In the foregoing embodiment, the signal generated by driving the first conductive axis and the second conductive axis is an alternating signal such as impulse signal or sine-wave signal. The output signals from the first conductive wire and the second conductive wire can be self-capacitance variable quantity caused by touch.

The electrostatic shielding method for the touch device of the foregoing embodiment is that the first conductive axis can be used to sense touch positions and also, function as a shielding layer, thereby reducing the interference of outside electronic signals and improving the detection accuracy for touch positions.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A touch device, comprising:
at least one first conductive axis;
a plurality of second conductive units, wherein the first conductive axis has a plurality of openings in which the second conductive units are located respectively, wherein there is a space existed between each of the second conductive units and the corresponding first conductive axis;
a plurality of bridging structures, wherein each of the majority of the bridging structures electrically connected to every two adjacent second conductive units in two adjacent first conductive axes; and
an insulating layer fully covering the first conductive axis, wherein the insulating layer has a plurality of holes exposing the second conductive units respectively, and the bridging structures electrically connect to the second conductive units through the holes;
wherein upon a driving signal received by the second conductive units, the first conductive axis is connected to a grounding potential or a fixed potential to conduct electrostatic shielding for the second conductive units; and
wherein the second conductive units are fully surrounded by the corresponding first conductive axis respectively.

2. The touch device of claim 1, wherein the second conductive units are patterned conductive units.

3. The touch device of claim 1, wherein each of the second conductive units has a plurality of small holes or strip openings.

4. The touch device of claim 1, wherein each of the first conductive axis comprises a first left-side conductive axis and a first right-side conductive axis separated from each other, and wherein the space existed between the second conductive units and the corresponding first left-side conductive axis and between the second conductive units and the corresponding first right-side conductive axis.

5. The touch device of claim 1, further comprising a substrate on which the first conductive axis and the second conductive units are disposed.

6. The touch device of claim 5, further comprising a protective layer overlaid and disposed on the bridging structures.

7. The touch device of claim 5, further comprising at least a display unit located underneath the substrate.

8. The touch device of claim 7, wherein there is no shielding layer existing between the substrate and the display unit.

9. The touch device of claim 7, wherein the display unit is a liquid crystal display.

10. The touch device of claim 1, further comprising a substrate on which the bridging structures are disposed.

11. The touch device of claim 10, further comprising a protective layer overlaid and disposed on the first conductive axis and the second conductive units.

12. The touch device of claim 1, wherein the bridging structures connect serially to the second conductive units to form at least one second conductive axis.

13. The touch device of claim 12, wherein the first conductive axes are arranged in parallel along a first direction, and the second conductive axes are arranged in parallel along a second direction which is different from the first direction.

14. The touch device of claim 13, wherein the first direction is perpendicular to the second direction.

15. The touch device of claim 1, further comprising a plurality of first conductive wires electrically connected to the first conductive axes respectively, and a plurality of second conductive wires electrically connected to a minority of the bridging structures.

16. An electrostatic shielding method of a touch device, wherein the method comprises the following steps:
- driving a first conductive axis fully covered by an insulating layer and detecting output signals of the first conductive axis to acquire first information concerning touch positions in a first direction;
- connecting the first conductive axis to a grounding potential or a fixed potential to conduct electrostatic shielding for a second conductive axis; and wherein the second conductive units are fully surrounded by the corresponding first conductive axis respectively;
- driving the second conductive axis and detecting output signals of the second conductive axis to acquire second information concerning the touch positions in a second direction; and
- combining the first information and the second information concerning touch positions in the first and second directions to calculate the coordinates of the touch positions.

* * * * *